April 1, 1952 L. E. BROUGHAM ET AL 2,591,128

DATA TRANSMITTING MEANS IN RECORD CONTROLLED STATISTICAL MACHINES

Filed March 18, 1947 10 Sheets-Sheet 1

INVENTORS
LESLIE ERNEST BROUGHAM
AND
JOHN PERRIN

BY J. L. Sterling
ATTORNEY

INVENTORS
LESLIE ERNEST BROUGHAM
AND
JOHN PERRIN
BY J. L. Sterling
ATTORNEY

April 1, 1952 L. E. BROUGHAM ET AL 2,591,128

DATA TRANSMITTING MEANS IN RECORD
CONTROLLED STATISTICAL MACHINES

Filed March 18, 1947 10 Sheets-Sheet 3

INVENTORS
LESLIE ERNEST BROUGHAM
AND
JOHN PERRIN

BY J. L. Sterling
ATTORNEY

April 1, 1952

L. E. BROUGHAM ET AL

DATA TRANSMITTING MEANS IN RECORD CONTROLLED STATISTICAL MACHINES 2,591,128

Filed March 18, 1947

10 Sheets-Sheet 4

Inventors
LESLIE ERNEST BROUGHAM
AND
JOHN PERRIN

BY J. L. Sterling
Attorney

INVENTORS
LESLIE ERNEST BROUGHAM
AND
JOHN PERRIN
BY J. L. Sterling
ATTORNEY

April 1, 1952

L. E. BROUGHAM ET AL
DATA TRANSMITTING MEANS IN RECORD
CONTROLLED STATISTICAL MACHINES 2,591,128

Filed March 18, 1947

10 Sheets-Sheet 6

INVENTORS
LESLIE ERNEST BROUGHAM
AND
JOHN PERRIN
BY J L Sterling
ATTORNEY

April 1, 1952 L. E. BROUGHAM ET AL 2,591,128

DATA TRANSMITTING MEANS IN RECORD CONTROLLED STATISTICAL MACHINES

Filed March 18, 1947 10 Sheets-Sheet 7

INVENTORS
LESLIE ERNEST BROUGHAM
AND
JOHN PERRIN

BY John L Sterling
ATTORNEY

INVENTORS
LESLIE ERNEST BROUGHAM
AND
JOHN PERRIN
BY J. L. Sterling
ATTORNEY

INVENTORS
LESLIE ERNEST BROUGHAM
AND
JOHN PERRIN
BY [signature]
ATTORNEY

INVENTORS
LESLIE ERNEST BROUGHAM
AND
JOHN PERRIN
BY John L Sterling
ATTORNEY

Patented Apr. 1, 1952 2,591,128

UNITED STATES PATENT OFFICE 2,591,128

DATA TRANSMITTING MEANS IN RECORD CONTROLLED STATISTICAL MACHINES

Leslie Ernest Brougham, Purley, and John Perrin, Croydon, England, assignors to Powers-Samas Accounting Machines Limited, London, England, a British company Application March 18, 1947, Serial No. 735,443
In Great Britain March 11, 1946

Section 1, Public Law 690, August 8, 1946
Patent expires March 11, 1966

8 Claims. (Cl. 101—93)

This invention relates to apparatus for transmitting data read from a record to the parts of a machine to be controlled thereby and has for its main object the provision of an improved apparatus which will transmit such data more rapidly than hitherto.

A further object of the invention is to provide a transmission means having greater flexibility than hitherto in regard to the interchangeability of connections between the record reading elements, such as sensing pins, and the elements, such as stops in a stop basket, to be controlled thereby.

According to the present invention apparatus for transmitting data read from a record to the parts of a machine to be controlled thereby, comprises in combination a plurality of intermediate elements disposed between the sensing means and the data transmitting elements, one intermediate element for each of a plurality of index point positions on the record, each of said intermediate elements being connectable to any one of the index point positions on the record and being responsive to the sensing of the index point position to which it is connected, means for connecting any one of said intermediate elements to any one of the index point positions on the record, a data transmitting element associated with each of said intermediate elements, means for reading the responsive or non-responsive condition of said intermediate elements, and means operative under the control of said reading means to actuate the data transmitting elements corresponding to the intermediate elements which are in responsive condition.

In constructions embodying the present invention the intermediate elements may be responsive to the setting of means set from the record by the action of the sensing means and accordingly the invention also includes a settable element for each of a plurality of index point positions on the record, each of said intermediate elements being connectable to any one of said settable elements and being responsive to the setting of the settable element to which it is connected.

Preferably, according to the invention, the sensing means operates to render live, selectively, contacts corresponding to the sensed indicia, which contacts constitute the intermediate elements, and are disposed in groups corresponding to the columns of the record, each group of contacts being read by an electrical brush associated with the group, the apparatus including also selecting means actuated magnetically to operate the data transmitting element corresponding to a particular contact when said contact, while in the live condition, is engaged by a brush.

The sensing means may include a sensing pin for each index point position on the record, and the settable elements, to the setting of which the intermediate elements or contacts are responsive may be in the form of contacts each appropriated to an associated sensing pin and arranged to be closed when the associated sensing pin detects a record perforation. Removable plug connections may be provided for connecting any one of said last mentioned contacts to any one of the contacts associated with the set-up elements, to which the data is to be transmitted, whereby a sensing pin in one column may be made to cause actuation of any set-up element in the corresponding column or in another column.

In such form of apparatus according to the invention the data transmitting elements by which the data is to be transmitted may be in the form of columns of spring-loaded pins mounted in a frame, each pin carrying a pivoted latch normally spring-urged against the side of a lifting bar disposed transversely of the columns of pins and common to corresponding pins in all the columns. The contacts associated with said data transmitting elements are arranged in columns and the brushes cooperating with them are mounted on a carriage reciprocable lengthwise of the columns of contacts at each record-reading cycle, said carriage carrying a lifting member movable by the travel of the carriage under each transverse bar in turn so as to lift it, said carriage carrying also a series of selecting elements each traversing by the carriage movement under an associated column of spring pins. The selecting elements for any column are disposed in advance of the lifting member and in such relation to the brush for reading the contacts corresponding to that column that, when the brush is on a particular contact, the selecting element is below the corresponding spring pin. Accordingly, if the contact is live, magnetic means energised through the contact and brush actuates the selecting element to raise the corresponding pin, whereby the latch of the latter moves over the top of the associated lifting bar and is lifted thereby so raising its pin.

The contacts associated with a sensing pin may be arranged, when engaged by their associated sensing pin, to render live an additional releasing contact which is engaged by the reading brush before the brush engages the reading contact also rendered live by the sensing pin, whereby the associated type-carrying element is released for movement in advance of the setting-up of the selected stop therefor.

In order that the invention may be more fully understood one embodiment thereof will now be described, by way of example, and with reference to the accompanying drawings, as applied to a record card controlled tabulating machine of the kind employing a sensing pin box for reading the record cards and a stop basket of which the stops are set through transmission elements, from the pins, those stops serving to set type carriers to print the sensed data. The type carriers may also be associated in the known manner with rack elements controlling accumulator wheels for the purpose of adding numerical amounts read from the cards.

In the drawings:

Fig. 1 is a section on the line I—I, Fig. 2*a*.

Fig. 2*a* and Fig. 2*b* are a section on the line II—II, Fig. 1,

Fig. 3 is a part of the apparatus shown in Fig. 1, drawn to an enlarged scale and showing some parts in different positions, Fig. 4 is a perspective view showing the disposition of the elements for setting-up the transmission pins, Fig. 5 is a partial elevation looking in the direction of the arrow A, Fig. 2*a*, and shows the mechanism for lifting the reading brushes from the contacts at the end of a reading stroke, Figs. 6*a* and 6*b* are a plan, some parts being removed, to show the disposition of the electromagnets.

Figure 1:
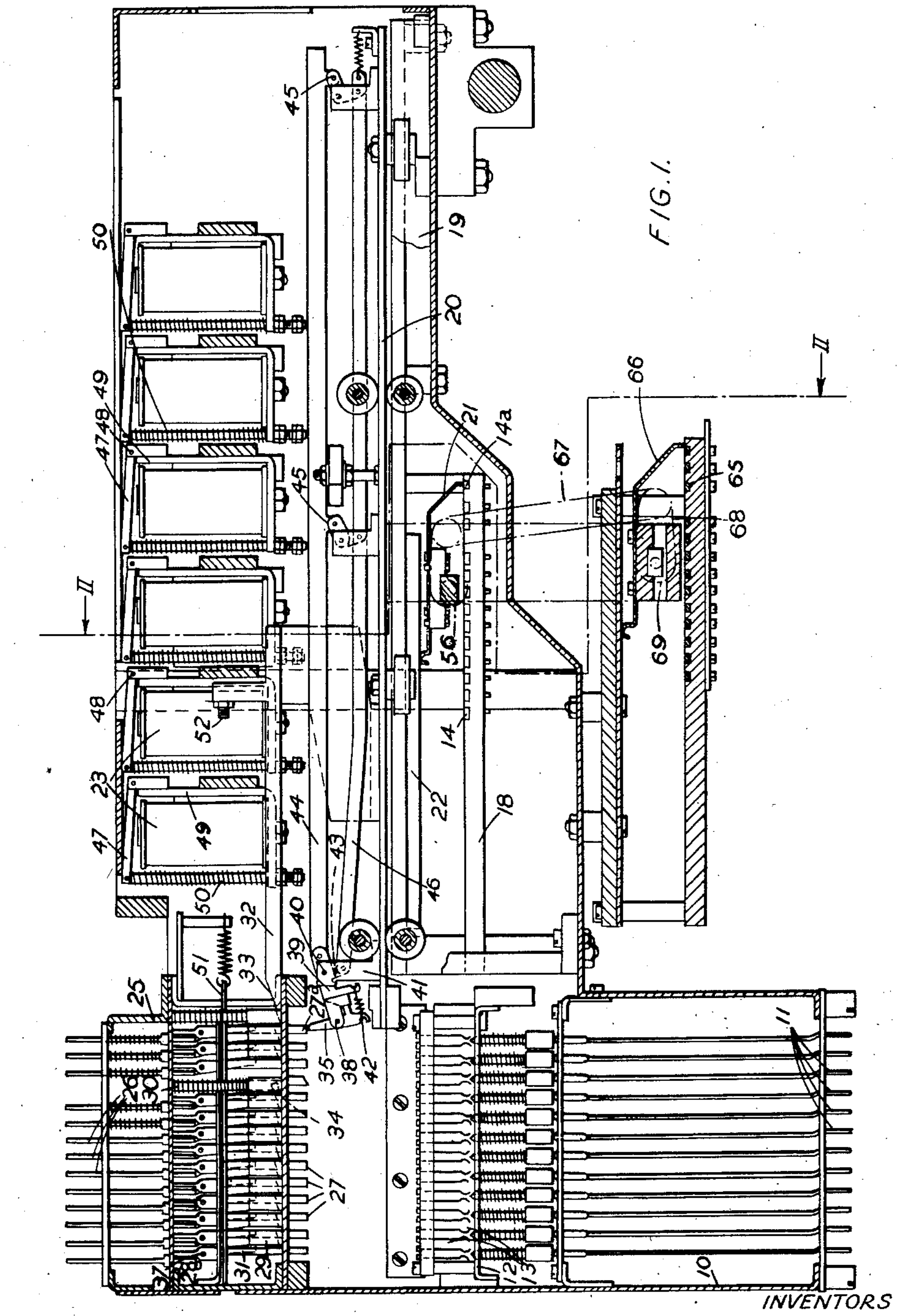
Figure 2A:
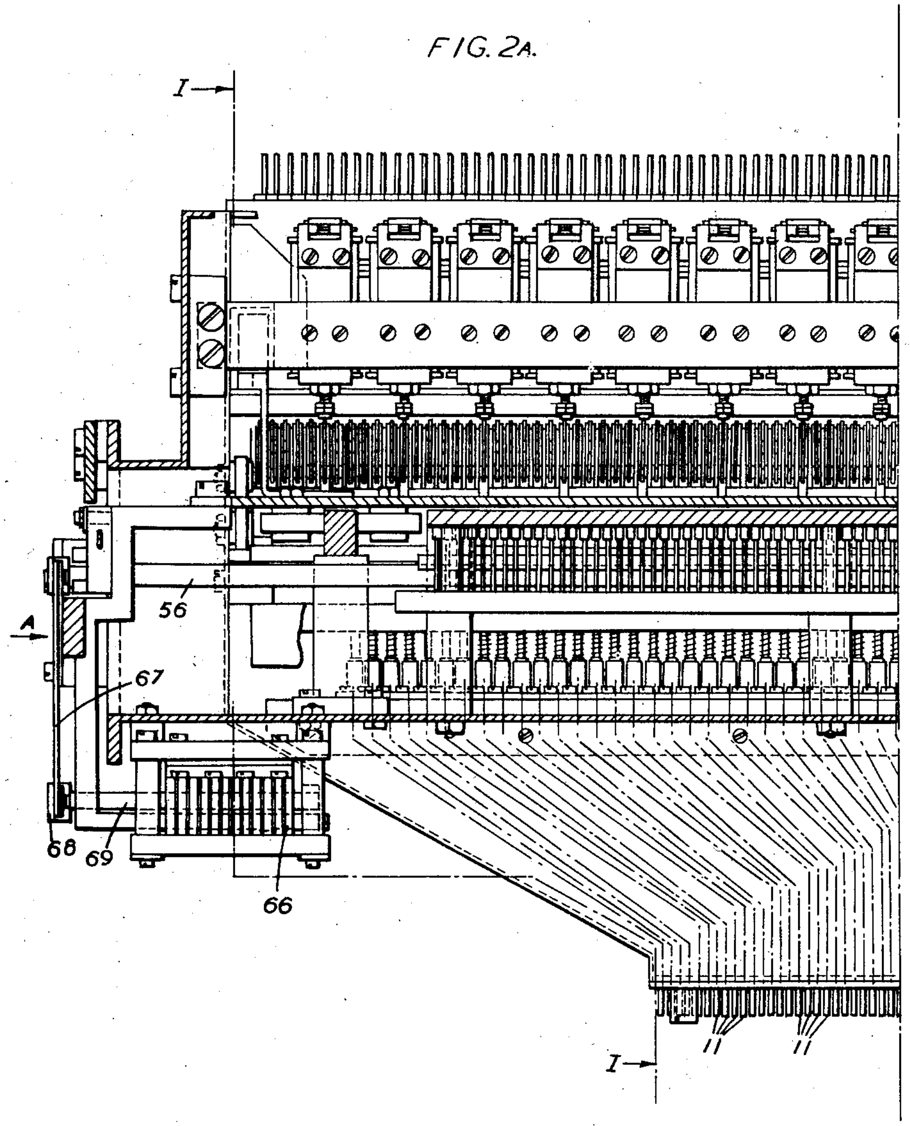
Figure 2B:
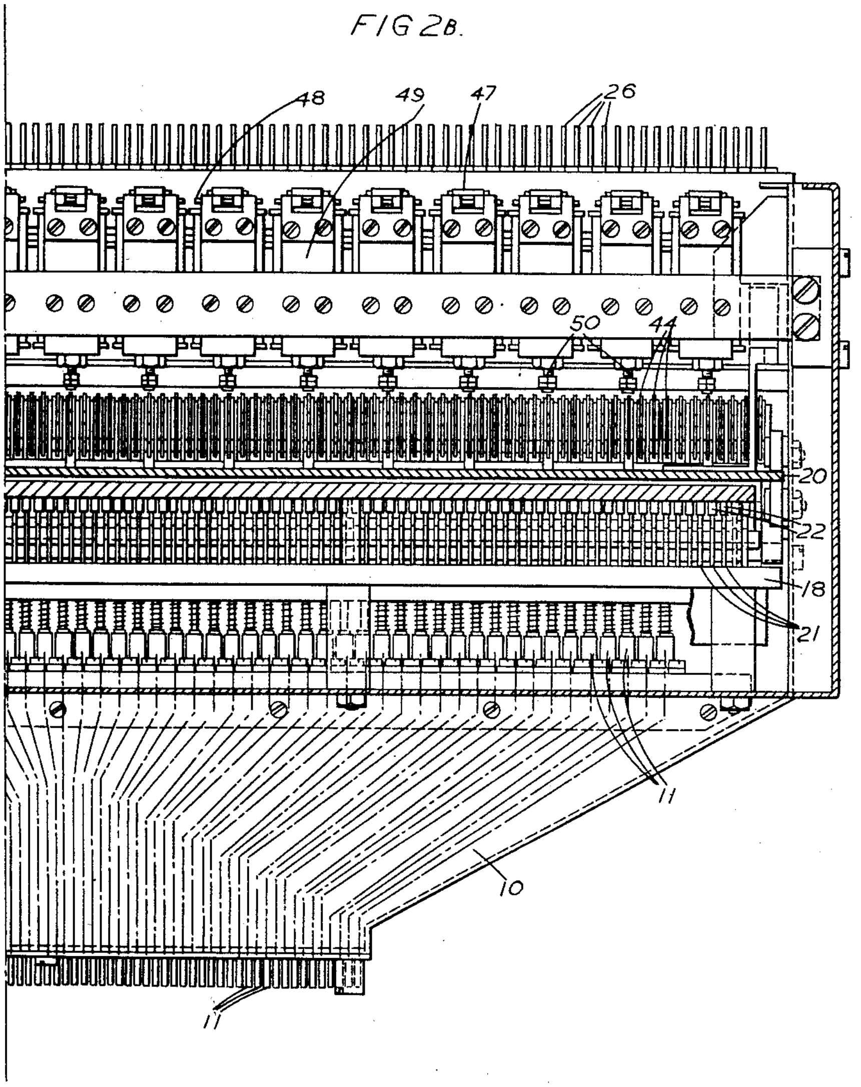

Referring to the drawings, there is provided to be disposed above a sensing pin box, not shown, a connection box 10 containing columns of connection wires 11 corresponding to the columns of sensing pins. The upper ends of the connection wires 11 pass through holes in an electro-conducting plate 12 and are spring loaded upwardly whereby good electrical contact with the plate is ensured, and disposed above each wire 11 is a two-bladed contact 13 to one blade of which is connected an electrical connection wire, which joins the contact with an intermediate element comprising a fixed contact 14. Each of the other blades of the contacts 13 in each column is connected with a common line 15, Fig. 8 for a purpose to be described below. All the contacts 13 are insulated from one another.

Figure 3:
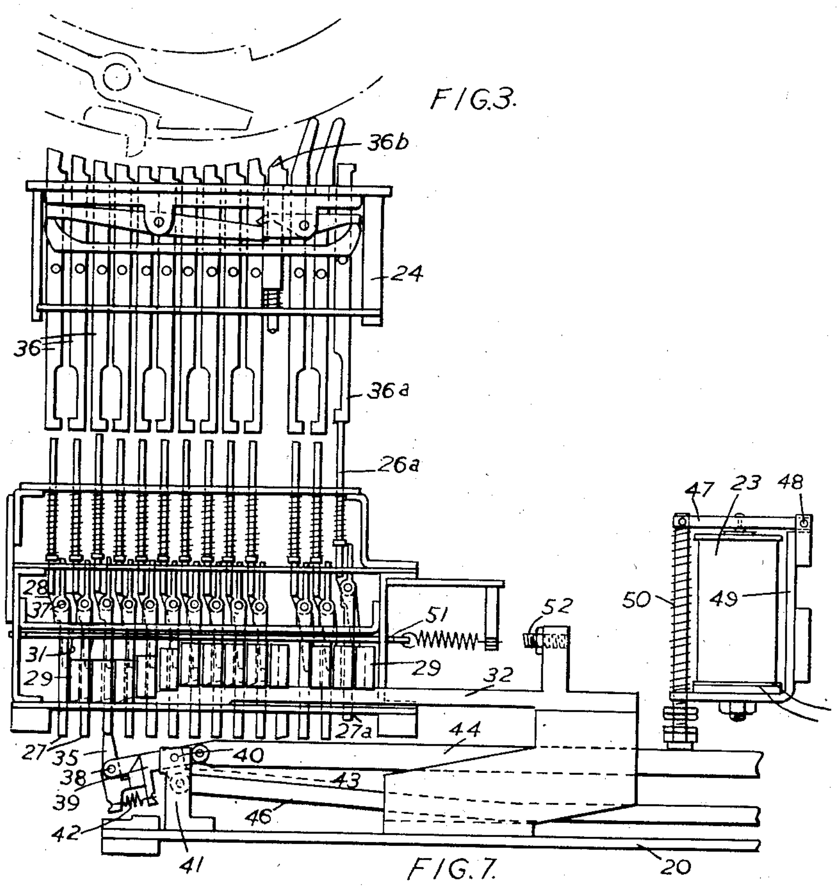

As shown in Figs. 1 and 3 a single column of wires 11 and associated elements is shown but it will be understood that there is a similar column for each column of index positions on a record card. For each column of connection box wires 11 there is provided a column of fixed contacts 14 each column of contacts containing as many contacts as there are wires 11 in the corresponding column of connection wires.

Figure 7:
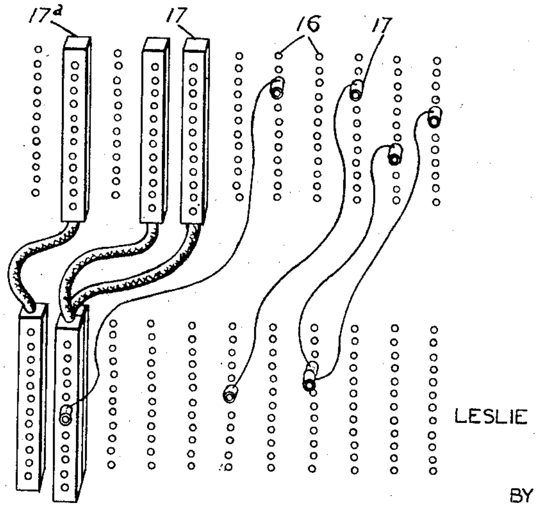
Fig. 7 is a diagrammatic representation of a plug-board showing index positions in different columns connected with each other.
Figure 4:
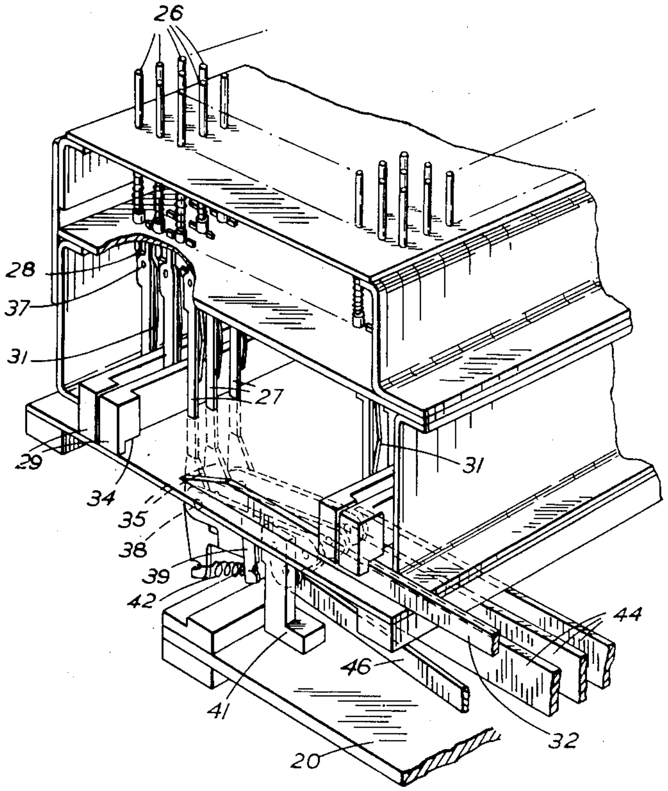

Each of these last mentioned contacts 14 is electrically connected to a socket 16, Fig. 7, and by means of removable plugs 17 carried by the afore-mentioned connecting wires any one of the first mentioned contacts 13 may be electrically connected to any one of the said sockets 16 whether in a corresponding column or in a different column. As shown diagrammatically in Fig. 7 individual sockets in different columns may be connected by plugs 17 or, if desired entire columns may be connected by plugs 17*a* which are also provided with sockets and receive individual plugs 17.

Thus, according to a feature of the invention any sensing pin may be electrically connected to any one of the second mentioned contacts 14, for example for No. 3 pin in column 10 may be connected to the No. 6 contact in column 48 or to the No. 3 contact in column 10 or to any other contact.

The second contacts 14 which will hereinafter be referred to as the "reading contacts" are disposed in columns side by side in an insulating plate 18, and mounted to slide horizontally in guides 19 above this insulating plate is a carriage 20 carrying a reading brush 21 to co-operate with each column of reading contacts 14. Thus if there are, for example, 65 columns of reading contacts there will be 65 reading brushes on the carriage.

In this connection as will be explained later, there may for certain practical reasons be a larger number of columns of reading contacts than there are columns on the card.

Each of the above-mentioned brushes 21 also makes a contact with a fixed electro conducting bar 22 and each of these bars is electrically connected through an actuating magnet 23 to the other side of the line, to which also the frame of the connection box is electrically connected in order to complete the circuit.

The sensing pin box may be of the form described in British patent specification No. 401,012 in which, on the rise of the pin box, the pins which have found a hole in the card raise the corresponding connection box wires 11.

Figure 8:
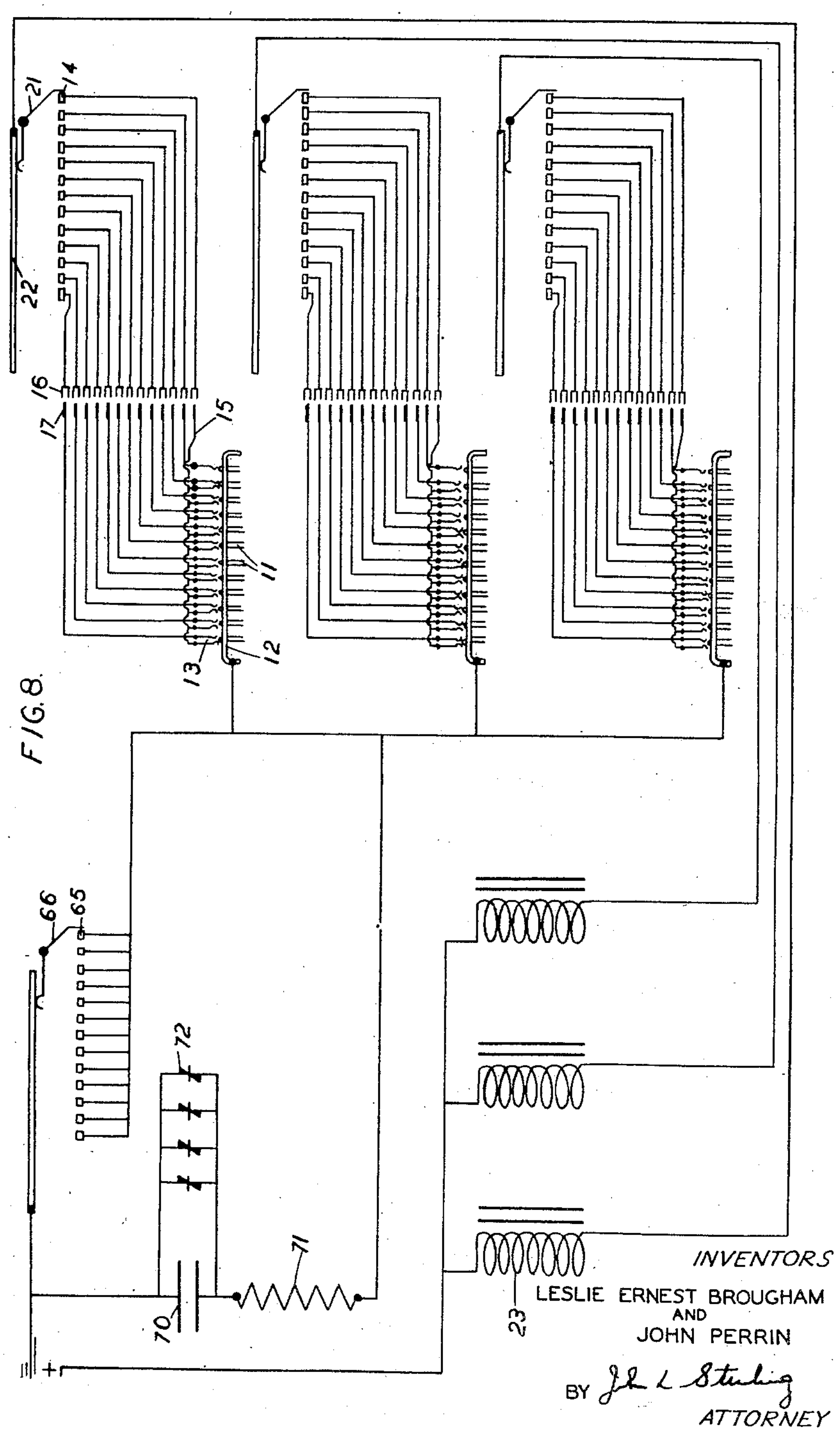
Fig. 8 is a diagrammatic circuit, showing three lines only, and including a spark quenching device.

Each connection box wire 11 which is thus raised engages its contact 13 and, through the associated plug connection 17, connects one of the reading contacts 14 to one side of the line thereby rendering it live. Simultaneously, the line 15, Fig. 8 is rendered live.

While the pins which have found holes in the record are all in their uppermost positions the reading contacts 14 corresponding to the holes in the record remain live and during this period the carriage 20 is moved horizontally by cams described below, to traverse the brushes 21 along the corresponding columns of reading contacts so that when any brush reaches a reading contact which has been rendered live, a circuit is completed through the brush to the electro-conducting bar 22 associated with that column and thence through the winding of the actuating magnet 23 corresponding to that column.

There is only one actuating magnet 23 to each column and the operations which result from energisation of one of these magnets will now be described.

Below the stop basket 24, Fig. 3, of the machine and adjacent to the carriage 20 is a fixed frame 25 containing a number of columns of spring loaded data transmission pins 26 and below these transmission pins is a corresponding number of columns of intermediate data transmission pins 27 each having a shoulder 28 underlying the lower end of the corresponding transmission pin 26 so that when any intermediate pin 27 is raised it will raise its corresponding transmission pin 26.

Also mounted in this fixed frame 25 and running transversely of the columns of intermediate pins is a series of lifting bars 29 there being one lifting bar to each transverse row of intermediate pins 27. At each end each lifting bar 29 is guided on a vertical post 30 and is spring urged downwardly. For the sake of clarity, all but two of these posts 30 have been omitted from Fig. 1 and none are shown in Fig. 3.

Each of the intermediate pins 27 carries pivoted thereto a depending latch 31 which normally has its lower end urged by the pin 26 against the vertical face of the adjacent lifting bar 29, so that, if said lifting bar is raised it will not engage under the latch, but will move upwards idly.

Mounted on the carriage 20 are two cam bars 32, the forward ends of which, having regard to the direction of the operative stroke of the carriage, are inclined as indicated at 33, by, for example about 20°, to the horizontal, the lower surfaces of these bars being level with the lower surfaces of the lifting bars 29.

In the vertical face of each lifting bar 29 which is directed towards the cam bars 32, namely the face opposite from that against which the pin latches 31 rest, there are formed at the bottom two wedge shaped recesses 34, there being one of these recesses disposed in the path of each cam bar 32 and each recess has an angle corresponding to that of the end 33 of the cam bar.

Accordingly as the carriage 20 moves forward in its operative travel the inclined ends 33 of the cam bars 32 engage in the wedge shaped recesses 34 of each lifting bar 29 in turn, so that during the forward travel of the carriage each of the lifting bars is raised.

As already mentioned, if all the latches 31 are resting against the vertical faces of the lifting bars 29 the raising of the latter is without effect.

Also mounted on the carriage is a selecting finger 35, for each column of intermediate pins 27, each of these selecting fingers 35 being just behind a dummy pin 27*a* in the corresponding column when the carriage is at the beginning of its operative stroke.

Further, each selecting finger 35 is disposed just in advance of the front edges of the cam bars 32 so that as the carriage 20 moves forward each selecting finger 35 will pass under the intermediate pins of its column in turn and will arrive under a particular pin just before the cam bars 32 lift the associated lifting bar 29.

As already explained there is an actuating magnet 23 for each column and when the magnet for any column is energised in the manner already explained, the associated selecting finger 35 is smartly raised and will consequently raise the intermediate pin 27 under which it then happens to be positioned.

This raising of the intermediate pin is insufficient to move the corresponding stop 36 in the stop basket 24 but is sufficient to lift its latch 31 until the lower end thereof is above the level of the top surface of the lifting bar 29 with the resulting that the spring rocks the latch, which is pivoted at 37, to bring its lower end above the lifting bar 29, whereby the ensuing raising of the latter further raises the intermediate pin 27 through the agency of its latch 31. This further raising of the intermediate pin is transmitted to the corresponding stop 36 through the spring loaded transmission pin 26 whereby the stop is set.

In order to actuate the selecting fingers 35 under control of the corresponding magnets 23 the mechanism now to be described is provided.

Each selecting finger 35 is pivoted at 38 approximately midway between its ends to one end of a lever 39 which is pivoted at 40 between its ends to a support 41 fixed to the carriage 20, the selecting finger 35, being held in its normal position relative to its supporting lever 39 by a spring 42.

The supporting lever carries an arm 43 projecting at right angles therefrom which arm, together with the portion of the supporting lever extending beyond its pivot 40, constitutes a bell crank. One arm of this bell crank is approximately horizontal and is connected by a horizontal bar 44 to corresponding arms of two other bell cranks 45, the other arms of the two bell cranks being also connected by a horizontal bar 46, whereby a parallel linkage is formed.

The armature 47 of the corresponding magnet is pivoted at 48 to a bracket 49 on which the magnet is mounted and actuates a plunger 50 which, on energisation of the magnet is depressed and depresses the upper bar 44 of the parallel linkage whereby the bell cranks are rocked, thereby lifting the end of the supporting lever 39 which carries the selecting finger 35 so that the latter is momentarily raised by the momentary energising of the magnet as the corresponding brush 21 passes over a reading contact 14 which is in the live condition.

Considering a numerical example and assuming that index point position No. 4 in column 8 of the card is plug connected to reading contact No. 7 in column 25 of the reading contacts then, when the pin box rises after having sensed the card, the connection wire No. 4 in column 7 will close its contact 13 and through the plug connection will connect the reading contact No. 7 in column 25 to one side of the line thereby rendering this contact live. The closing of the contact 13 simultaneously conditions the line 15 and renders live the reading contact 14*a* which is the first reading contact to be engaged by the reading brush 21.

The carriage 20 then makes its operative stroke and the reading brush for column 25 will, in reaching contact 14*a* complete the circuit through the magnet 23 for column 25. At the moment when the magnet is thus energised, the selecting finger 35 for column 25 will be below the intermediate pin 27*a* in column 25 and accordingly the resulting upward movement of the selecting finger 35 will lift the intermediate pin 27*a*. Immediately thereafter the lifting bar 29*a* is raised by the cam bars 32 on the carriage 20 and imparts a further lift to the intermediate pin 27*a* whereby the stop 36*a* in column 25 of the stop basket 24 is set. This results in the release of stop 36*b* in the manner described in British patent specification No. 454,857 so that the type carrying sector for column 25 is released and starts to move over the tops of the stops 36. Thus, by the time the No. 7 stop in column 25 is set the type carrying sector will be almost in position to be engaged and arrested by the stop and a gentle engagement of the parts will be effected.

It will be appreciated that the stop 36*b* is always released before any of the other stops is set, because the line 15 is energised whenever a contact 13 is closed in any column. The purpose of this arrangement is to avoid the type carrying sector, which is moved under spring influence from crashing against a stop, particularly those to the left of the stop basket as viewed in Fig. 3, as would happen if the stop 36*b* were not released until the stop was set as would be the case if the dummy stop 36a was not provided to operate as just described.

After the dummy stop 36a has been set and the type carrying sector released, the carriage 20 continues its forward movement until the reading brush 21 in column 25 reaches the reading contact for the sensed No. 7. The magnet 23 for column 25 is then again energised and its plunger 50 engages the upper bar 44 as shown in Fig. 3 to again operate the selecting finger 35 for column 25 as described above.

The latches 31 are at this time still on top of the lifting bar 29 and in order to restore the latches to their normal positions a shutter 51 is provided similar to that disclosed in specification No. 401,012 and formed with slots in which the latches pass. The shutter 51 is reciprocated at each forward movement of the carriage 20 by the engagement of a stop 52 on the carriage with the shutter so rocking the latches about their pivots 37 in a direction to bring them clear of the lifting bars 29, whereupon the spring pins 26 move the latches 31 down to their normal positions in which their lower ends are in contact with the vertical faces of the respective lifting bars 29. The carriage 20 then returns, thereby withdrawing the cam bars 32 from underneath the lifting bars 29 which are returned to their lowermost positions by springs on the posts 30.

Figure 5:
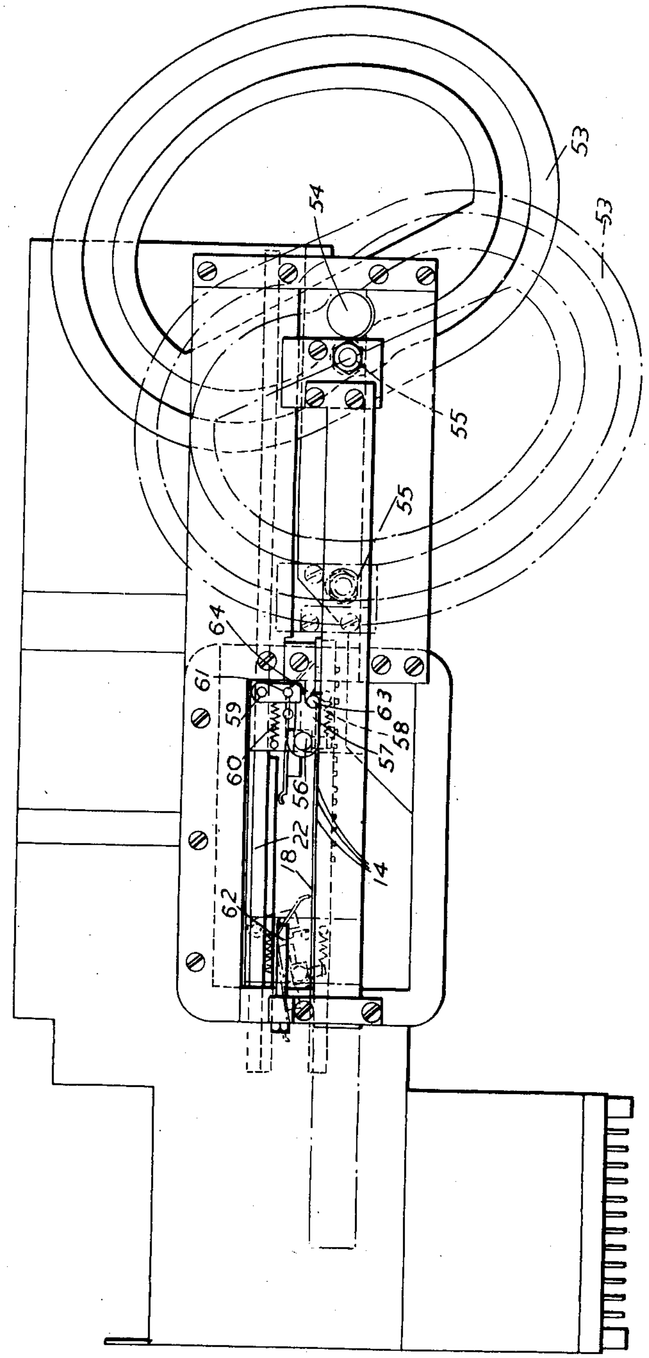

The carriage 20 is conveniently operated by a pair of track cams 53, Fig. 5, secured to a shaft 54 driven at the same speed as the tabulator main shaft, each cam 53 engaging a laterally projecting roller 55 on the carriage 20 whereby the desired reciprocating movement is imparted to the latter.

It is preferred to raise the reading brushes 21 from the contacts 14 during the return of the carriage 20 in order to avoid damage to the brushes and this section may be effected by mounting the brushes on a rockable shaft 56 carrying an arm 57, Fig. 5, which is urged by a spring 58 in a direction to raise the brushes, but is held, by a latch 59 and spring 60, in a position to hold the brushes to the contacts during the operative stroke of the carriage. The latch 59 carries a pin 61 which, as the carriage approaches the end of its operative stroke, engages a fixed abutment 62, thereby disengaging the latch and allowing the shaft 56 to rock under the action of its spring 58 so as to raise the brushes clear of the contacts, the spring holding them raised.

The arm 57 on the brush-carrying shaft has a laterally projecting pin 63, which as the carriage approaches the end of its return stroke engages a fixed cam member 64 which depresses the arm to permit the latch 59 to re-engage it thereby rocking the shaft 56 into the position in which the brushes are once more in engagement with the contacts 14 in readiness for the next operative stroke of the carriage 20, the shaft 56 being held in this position by the latch 59.

As already mentioned the raising of the intermediate pins 27 by means of the lifting bars 29 effects the setting of stops 36 in the stop basket 24 representing the data sensed from the card and in order to print this information type sectors may be employed which are settable from the stops.

In a normal tabulating machine the advance of the sectors to take a setting from the stops has to be delayed until all the stops have been set.

According to the present invention the advance of the sectors is permitted to begin before any stop in any column has been set. The advance of the sectors, however, follows the advance of the selecting finger 35 so that the sectors overtaking the fingers reach a stop just after the stop has been set.

Accordingly constructions according to the invention shorten the time required for setting the sectors and thereby appreciably increase the speed of operation of the machine.

In order to prevent sparking at the reading contacts 14 an additional set of supply contacts 65 may be provided, each of which is shorter in the direction of travel of the brushes than are the reading contacts 14. The carriage 20 carries a supply brush 66 co-operating with the supply contacts 65 and the current supply circuit to the reading brushes 21, which sweep over the reading contacts 14, is made through the supply contacts 65 and supply brush 66.

The reading brushes 21 and the supply brush 66 are so relatively positioned that each reading brush 21 engages with a given reading contact 14 just before the supply brush 66 engages the corresponding supply contacts 65, and because the supply contacts 65 are shorter than the reading contacts 14, the supply brush 66 leaves each supply contact 65 before the reading brush 21 leaves the corresponding reading contact 14. In this way the reading contacts are connected to the source of supply after their reading brushes have made contact with them and are disconnected therefrom before the brushes disengage them.

In order to raise the supply brushes from the supply contacts, the arm 57 on the shaft 56 which carries the reading brushes 21 is connected by a link 67, Fig. 1 to an arm 68 on a rockable shaft 69 carrying the supply brushes, whereby the two shafts 56, 59 are rocked to raise both sets of brushes simultaneously.

There is one set of supply contacts 65 common to all the reading columns of reading contacts 14 and in order to minimise sparking at the supply contacts 65 a spark quenching circuit is employed in conjunction therewith.

As shown in Fig. 8, the quenching circuit comprises a condenser 70 and resistance 71 connected in series with one another and in parallel with the supply contacts 65, and a number of "Atmite" spark quenchers 72 connected across the condenser 70.

Figure 9:
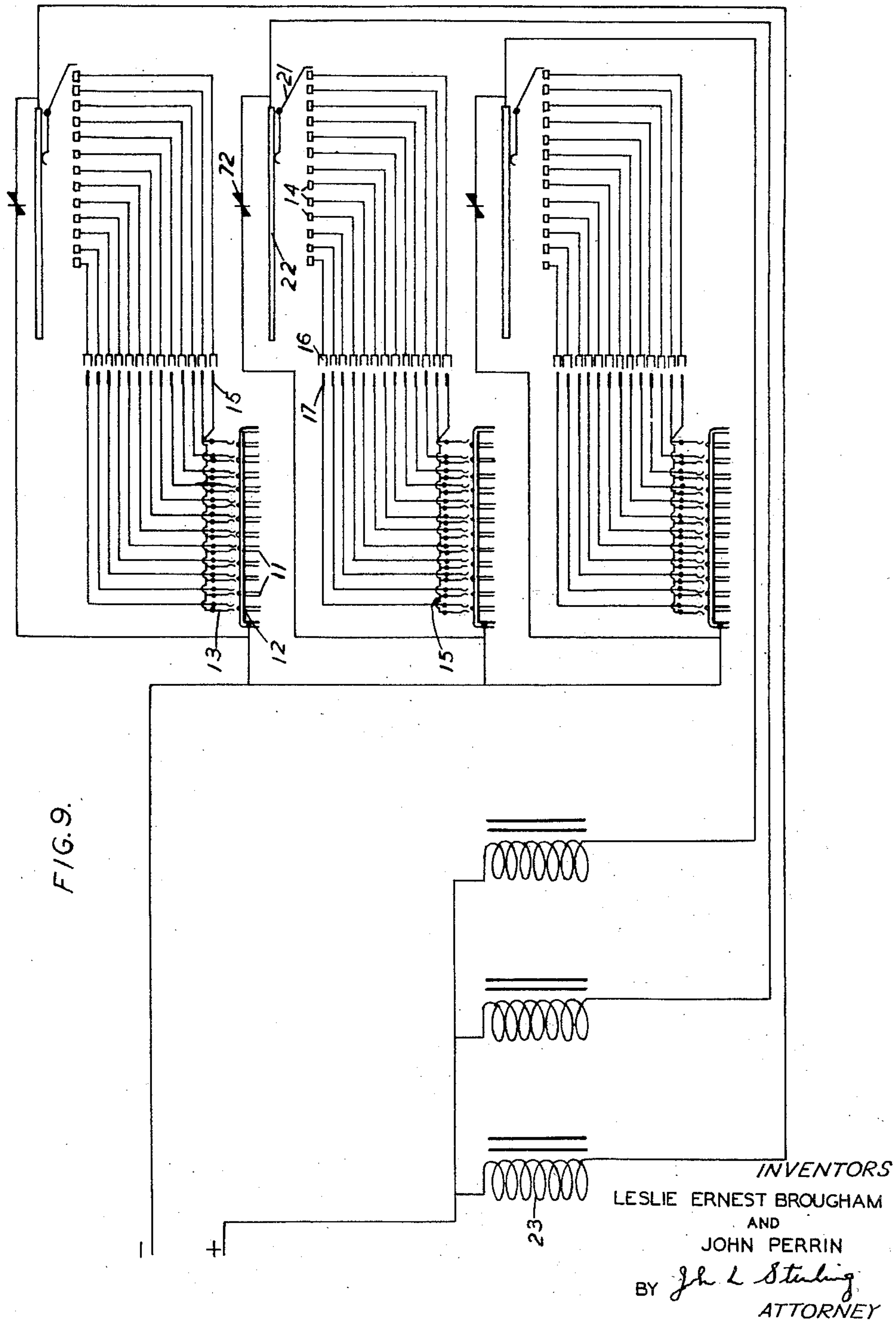
Fig. 9 is a further diagrammatic circuit, showing three lines only, but including an alternative form of spark quenching device.

Preferably, however, an "Atmite" spark quencher is included in each individual line as shown in Fig. 9.

In record controlled tabulating machines the printing sectors and the columns of stops 36 which control them are usually arranged in groups, with spaces between them. For example, there may be seven groups, each of ten columns, and a space equivalent to six columns between adjacent groups, so that the overall width is equivalent to 106 columns. In such machines two of the ten-column groups and the space between them may be replaced by one 25-column group used for alphabetical-numerical work.

Figure 6A:
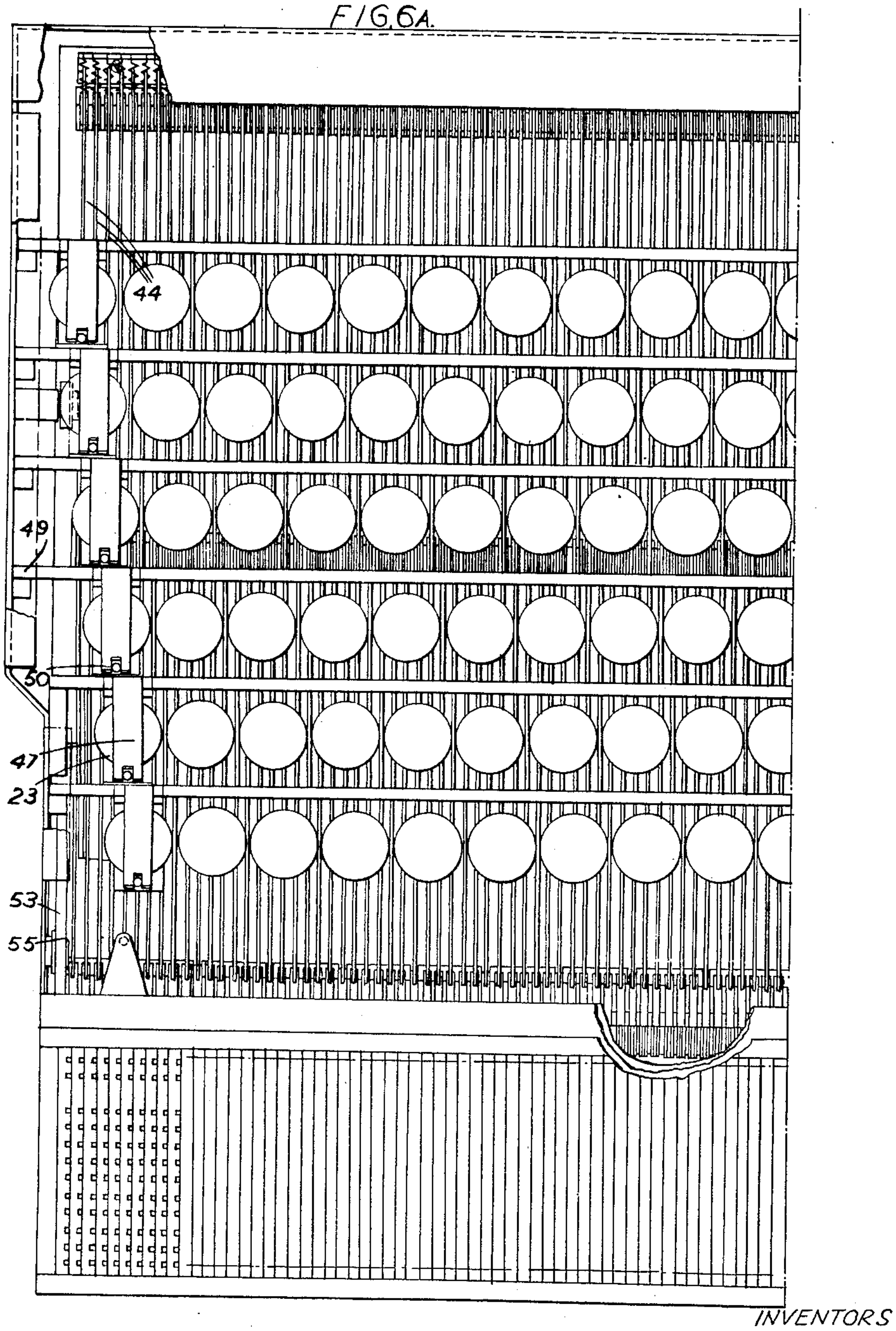
Figure 6B:
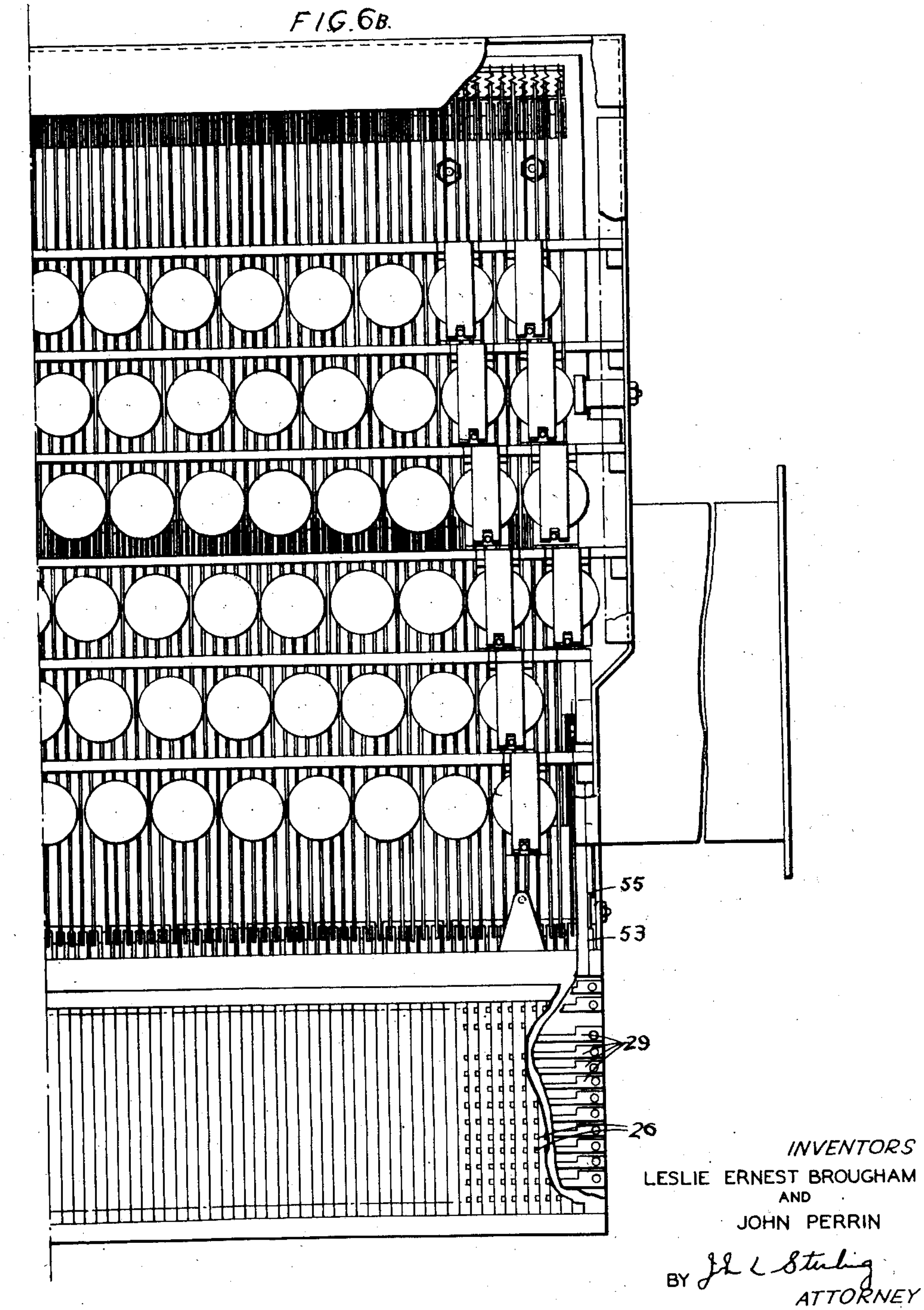

In order to render the apparatus according to the invention applicable to either form of grouping, said apparatus is preferably provided with a number of columns of reading contacts 14 equal to the maximum possible number of columns of stops in the machine, that is, 106 columns in the above example. The plan, Fig. 6, shows the disposition of the magnet 23 and associated parts for use in such an arrangement.

In transmitting data recorded on the cards in code, it may be necessary to lift two adjacent intermediate pins simultaneously. As the setting finger may not have time to return to normal position after having set the first pin, before it has reached the second pin, the said two adjacent pins may be spaced further apart than are the remaining pins and a fixed cam block may be disposed between them, which forces the setting finger down as it passes along from the first pin to the second so that the finger is lowered in time to be raised again to lift the second pin. With the apparatus described above, however, this modification has not been found to be necessary.

The invention may also be applied to record controlled machines other than tabulators, for example, to sorters, thus enabling the shutter mechanism of any sorting compartment to be controlled from any hole position on the record.

Although, in the foregoing, the invention has been particularly described as applied to apparatus employing sensing pins to sense record perforations, the invention is also applicable to apparatus in which records are read by other means; for example, by the passage of spark discharges through relatively small holes in the record or by photoelectric means.

We claim:

1. In a machine controlled by records having data denoting index positions and including means for sensing individual index positions of said records and set-up members associated with said sensing means, apparatus for transmitting data sensed from a record to said set-up members comprising in combination a plurality of intermediate elements between the sensing means and the set-up members, one intermediate element corresponding to each of a plurality of index point positions on the record, each of said intermediate elements being connectable to the means for sensing any one of the index point positions on the record and being responsive to the sensing of the index point position to which it corresponds, means for connecting any one of said intermediate elements to the means for sensing any one of the index point positions on the record, a data transmitting element associated with each of said intermediate elements for actuating a set-up member, a reciprocable carriage cooperating with said intermediate elements and said transmitting elements, means on said carriage for reading the responsive or non-responsive condition of said intermediate elements, and selecting means operative under the control of said reading means to actuate the data transmitting elements corresponding to the intermediate element which are in responsive condition.

2. Apparatus according to claim 1, wherein the sensing device operates to render live, selectively, contacts corresponding to the sensed indicia, which contacts constitute the intermediate elements, and are disposed in groups corresponding to groups of data transmitting elements and wherein said reading means includes an electrical brush associated with the group, the selecting means being actuated magnetically to operate the data transmitting element corresponding to a particular contact when said contact, while in the live condition, is engaged by a brush.

3. In a machine controlled by records having data denoting index positions and including record sensing means and set-up members associated with said sensing means, apparatus for transmitting sensed data to said set-up members comprising in combination settable means actuable in accordance with said sensing means and including a settable element for each of a plurality of index point positions on the record, a corresponding plurality of intermediate elements disposed between said settable means and the set-up members, each of said intermediate elements being connectable to any one of said settable elements and being responsive to the setting of the settable element to which it is connected, means for connecting any one of said intermediate elements to any one of said settable elements, a data transmitting element associated with each of said intermediate elements for actuating a set-up member, a reciprocable carriage cooperating with said intermediate elements and said transmitting element, means on said carriage for reading the responsive or non-responsive condition of said intermediate elements, and means operative under the control of said reading means to actuate the data transmitting elements corresponding to intermediate elements which are in responsive condition.

4. Apparatus for transmitting to set-up elements, such as the stops in a stop basket, data sensed from indicia, such as perforations on a record having columnary arranged index positions, comprising a plurality of contacts corresponding to the sensed indicia, said contacts being disposed in groups corresponding to the columns of the record and selectively enlivened in accordance with sensed indicia, an electrical brush associated with the group for reading the condition of said contacts in succession, settable means for associating any contact in any group with any index point position in any column of the record, a carriage for advancing said brush, a transmitting element for each contact disposed to actuate a related set-up element, said transmitting elements being arranged in columns corresponding to the groups of contacts, and selecting means on said carriage and actuated magnetically to set the transmitting element corresponding to a particular contact when said contact, while in the live condition, is engaged by a brush.

5. Apparatus according to claim 4 for use with sensing means, including a sensing pin for each index point position on the record, wherein the settable means comprise contacts each appropriated to an associated sensing pin and arranged to be closed when the associated sensing pin detects a record perforation, and wherein removable plug connections are provided for connecting any one of said last mentioned contacts to any one of the contacts associated with said brushes, whereby a sensing pin in one column may be made to cause actuation of any set-up element in the corresponding column or in another column.

6. An apparatus according to claim 4 wherein a column of set-up elements operate to limit a differentially positionable member, such as a type bar, and includes a releasing element operative for releasing said member for limiting engagement with another element of the same column, and wherein each group of contacts includes a corresponding releasing contact rendered live concurrently with the energization of any other contact within the same group and disposed for prior engagement by the reading brush associated with each group, whereby the associated differentially positionable member is released for movement in advance of the setting of the set-up element selected therefor.

7. A machine according to claim 3 wherein the data transmitting elements comprise yieldable pins arranged in columns extending longitudinally to the path of movement of aid carriage each pin mounting a latch member engageable upon initial actuation of the pin with an associated lifting bar disposed transversely to said columns of pins, and wherein the means for actuating said transmitting elements include a plurality of lifting members and a series of selecting elements mounted on said carriage, said selecting elements being magnetically operated to initially actuate pins corresponding to the intermediate elements which are in responsive condition, said lifting members being disposed on said carriage rearwardly of said selecting elements and arranged for bearing engagement with said lifting bars to positively actuate those pins selected for latching engagement with a lifting bar into effective data transmitting position.

8. Apparatus according to claim 3 wherein the data transmitting elements and the intermediate elements are arranged in corresponding columns, said data transmitting elements comprising a plurality of spring urged pins yieldably retained in an ineffective data transmitting position, and wherein said actuating means under control of said reading means includes a series of magnetically operable selecting elements carried by said carriage into engageable relation with said pins, one for each column of said data transmitting elements and disposed with relation to the reading means in position to actuate a selected one of said transmitting elements when the reading means is positioned by said carriage into reading engagement with the associated one of said intermediate elements.

LESLIE ERNEST BROUGHAM.
JOHN PERRIN.

REFERENCES CITED

The following references are of record in the file of this patent:

UNITED STATES PATENTS

| Number | Name | Date |
|---|---|---|
| 1,333,890 | Wright | Mar. 16, 1920 |
| 1,730,513 | Lasker | Oct. 8, 1929 |
| 2,027,916 | Lasker | Jan. 14, 1936 |
| 2,290,827 | Thomas | July 21, 1942 |
| 2,421,078 | Mueller | May 27, 1947 |
| 2,448,781 | Daly | Sept. 7, 1948 |

FOREIGN PATENTS

| Number | Country | Date |
|---|---|---|
| 614,956 | Germany | June 22, 1935 |